United States Patent
Bolmarcich et al.

(10) Patent No.: US 6,539,435 B2
(45) Date of Patent: Mar. 25, 2003

(54) SYSTEM AND METHOD FOR ESTABLISHING DIRECT COMMUNICATION BETWEEN PARALLEL PROGRAMS

(75) Inventors: Anthony Simon Bolmarcich, Carmel, NY (US); Peter Frank Corbett, Scarsdale, NY (US); Julian Satran, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/892,134

(22) Filed: Jul. 14, 1997

(65) Prior Publication Data

US 2002/0129176 A1 Sep. 12, 2002

Related U.S. Application Data

(63) Continuation of application No. 08/493,034, filed on Jun. 21, 1995, now abandoned.

(51) Int. Cl.$^7$ ................................................ G06F 9/00
(52) U.S. Cl. ..................................... 709/310; 709/107
(58) Field of Search ................................. 395/680, 684, 395/677, 671, 683; 709/310, 312, 313, 106, 107, 108, 330, 102, 328

(56) References Cited

U.S. PATENT DOCUMENTS

| | | | | |
|---|---|---|---|---|
| 4,649,473 A | * | 3/1987 | Hammer et al. | 364/200 |
| 4,692,861 A | * | 9/1987 | May | 364/200 |
| 4,800,521 A | * | 1/1989 | Carter et al. | 364/900 |
| 4,837,676 A | | 6/1989 | Rosman | 364/200 |
| 4,907,190 A | | 3/1990 | Sasaki et al. | 364/900 |
| 5,088,034 A | | 2/1992 | Ihara et al. | 395/700 |
| 5,095,421 A | * | 3/1992 | Freund | 395/650 |
| 5,179,715 A | | 1/1993 | Andoh et al. | 395/800 |
| 5,257,372 A | * | 10/1993 | Furtney et al. | 395/650 |
| 5,305,461 A | * | 4/1994 | Feigenbaum et al. | 395/775 |
| 5,313,638 A | * | 5/1994 | Ogle et al. | 395/725 |
| 5,329,619 A | | 7/1994 | Page et al. | 395/200 |
| 5,363,121 A | * | 11/1994 | Freund | 395/600 |
| 5,396,630 A | * | 3/1995 | Banda et al. | 395/700 |
| 5,440,740 A | * | 8/1995 | Chen et al. | 395/650 |
| 5,459,871 A | * | 10/1995 | Van Den Berg | 395/650 |
| 5,479,598 A | * | 12/1995 | Feitelson et al. | 395/155 |
| 5,488,703 A | * | 1/1996 | Ferree et al. | 395/200.12 |
| 5,771,383 A | * | 6/1998 | Magee et al. | 395/680 |

OTHER PUBLICATIONS

S. Henderson, J. Kovaric, "Advanced Program–to–Program Communicaitons (APPC)", OS/2 Notebook, ed. D. Conklin, Microsoft Press, pp. 289–323, 1990.*

(List continued on next page.)

*Primary Examiner*—Sue Lao
(74) *Attorney, Agent, or Firm*—Douglas W. Cameron; Anne Vachon Dougherty (57) ABSTRACT

The invention is a system and method for establishing a communication connection between two programs, each running on multiple processors of a distributed or shared memory parallel computer, or on multiple computers in a cluster of workstations or a set of network connected workstations. The invention includes all protocols that require one of the two programs that wish to communicate to actively initiate the communication session, while the other program passively accepts such direct communication session initiations. No task of the active program of the connection will attempt to communicate with tasks of the passive program until after it has been notified that all passive program tasks are prepared to receive messages, and that all other active program tasks are prepare to receive messages from the passive programs tasks, and vice versa. Further, the tasks of the passive program are free running during establishment of the connection; while the active program tasks are free to run provided that they do not attempt to communicate with the second program. Another aspect of the invention provides a secondary indirect communication channel mediated by as resource manager separate from the active and passive programs.

17 Claims, 3 Drawing Sheets

OTHER PUBLICATIONS

R. Orfali, D. Harkey, Client/Server Programming with OS/2 2.1, 3rd Edition, Van Nostrand Reinhold, chapter 24, pp. 501–536, 1993.*

D. Mukhopadhyay, "Managing Interoperability Using APPC", 1993 International Workshop on System Management, IEEE publication Ondisc, pp. 54–62, 1993.*

A. Goscinski, Distributed Operating Systems the Logic Design, Addision–Wesley Publishing Company, pp. 139–146, 1991.*

E. Stevens, B. Bernstein, "APPC: The future of microcomputer communications within IBM's SNA", Data Communications, pp. 169–174, Jul. 1986.*

A. Goscinski, Distributed Operating Systems The Logic Design, Addison–Wesley, pp23–26, 139–141, 151–157, 1991.*

A. Silberschatz, P. B. Galvin, Operating System Concepts, pp20–23, 1994.*

P. Muth and T.C. Rakow "Atomic Commitment for Integrated Database Systems", Proc. 7th Int. Conf. on Data Engingeering, pp296–304, 1990.*

V. Bala, "CCL: A Portable and Tunable Collective Communication Library for Scalable Parallel Computers", IEEE, pp. 835–843, Apr. 1994.*

* cited by examiner

SYSTEM AND METHOD FOR ESTABLISHING DIRECT COMMUNICATION BETWEEN PARALLEL PROGRAMS

This is a continuation of application(s) Ser. No. 08/493,034 filed on Jun. 21, 1995, now abandoned.

FIELD OF THE INVENTION

The invention relates to parallel processing systems, and in particular to a protocol for interprogram communication in such systems.

BACKGROUND OF THE INVENTION

In parallel computing, it is typical for communication to be provided among the processes, or "tasks", of a parallel application program, or "job". Usually, such communication requires the setting up of some information in the communication system software. For example, routing tables often are required to provide a translation between a logical task number within the job (typically numbered 0 to n−1), and a physical port or address within the parallel computer. Such information is usually partially set up when the computer is initialized, with the remainder of the information being set up when the job is initialized.

There is a need to provide communication, not only among the tasks of a parallel job, but also from the tasks of the parallel job to tasks outside the job. Such communication could occur, for example, between two separately initiated programs running at the same time, and wishing to exchange data between themselves. Such communication could also occur between a parallel application program (a parallel "client"), and another parallel program which provides a service within the parallel computer (a parallel "server").

There are several problems that arise in trying to facilitate such communication between a parallel application program communicating with another parallel program providing a service within the parallel computer. The typical approach has been to "hard code" (i.e., to set and make known a priori) the addresses of the processes of one program, and to make these addresses known system wide. Another program wishing to communicate with the first program simply sends messages to the known addresses. There are several problems with this approach:

1) It does not provide any dynamic information about running programs. If a server program is not currently executing for some reason, there is no way for a client program to become aware of this, as it has only the hard coded address information about the server.
2) There is no control of transient information about the client and the server, for example, if some of the nodes of the server are aware of the client while others are not.
3) There is no way for a server to have complete information about a client, as it receives messages from individual tasks of the client without first receiving notification that such messages are to be sent, or what the full extent of the client nodes of a particular application are. If a server task receives a message from a task of a previously unknown client program, that server task will not be aware of which other tasks are also members of the client program, the number of such tasks, or what their physical addresses are. Also, the other tasks of the server will not know anything about any of the client tasks. Such information is usually required for proper management of server resources.

The problem is even more difficult in the case where two application programs wish to communicate. In this case, neither program is run on a predetermined or fixed set of nodes. The set of nodes on which a program is run is usually determined when the program is initiated. There is no simple way to hard-code the addresses of one program's tasks in a way that the other program's tasks can discover them.

Furthermore, in the case of either client-server or interprogram communication, there is no way to ensure that one program is made aware of the termination of the other program. Potentially, this could leave one program blocked (i.e., unable to proceed until it receives a response) while trying to communicate with the other program.

Thus, there is a clear need for a flexible protocol for establishing communication between two parallel programs.

SUMMARY OF THE INVENTION

This invention provides a method for establishing a communication connection between two parallel programs, each running on multiple processors of a distributed memory parallel computer, such as an IBM SP2, or on multiple computers in a cluster of workstations or a set of network connected workstations. Such a method is necessary in an environment where communication among processes of separate parallel programs is desired, and where some control, such as authentication of the program with which communication is desired and authorization to connect to that program, is also desired.

One application of this method is to provide communication sessions between parallel clients and parallel servers in parallel computers, for example, to link parallel application programs to a parallel file system.

Thus, the invention is a family of protocols that constitute a method for establishing a connection or communication session between two programs, each having one or more tasks and running on a plurality of processors, wishing to communicate with each other. The protocol family includes all asymmetrical protocols for establishing client-server connections between parallel clients and parallel servers, parallel clients and serial servers, and serial clients and parallel servers. The protocol family also includes asymmetrical protocols for establishing connections or communication sessions between two peer parallel programs that wish to intercommunicate. Protocols that establish communication between one parallel and one serial program are also included. The invention includes all protocols that require one of the two programs that wish to communicate to actively initiate the communication session, while the other program passively accepts such communication session initiations.

A first element of the invention is that there is a basic asymmetry to the protocol, with one program actively requesting the connection, and the other program passively accepting or rejecting it.

A second element of the invention is that no task of the active program of the connection will attempt to send messages or otherwise communicate with the tasks of the passive program that accepts the connection until after it has been notified that all the passive program tasks are prepared to receive messages from any task of the active program, and also that all other active program tasks are prepared to receive messages from any passive program task.

A third element of the invention is that no task of the passive program will attempt to send messages to any task of the active program until it is certain that all the tasks of the active program are prepared to receive messages from any task of the passive program, and also that all other passive program tasks are prepared to receive messages from any active program task.

A fourth element of the invention is that it allows that the tasks of the passive program be free running during the entire connection establishment. The tasks of the active program are free to run for the duration of the connection establishment as long as they do not attempt to communicate with the passive program until they are informed that the connection has been established.

A fifth element of the invention is that the connection protocol is mediated through a secondary, indirect communication channel between the tasks of the active program and the tasks of the passive program.

DETAILED DESCRIPTION

The invention is a method for establishing interprogram communication between two programs, one or both of which can be a parallel program. The invention is described as a family of protocols for coordinating the establishment of the communication between the two such programs. We have tested the invention by implementing a system using a protocol that is a member of this family of protocols.

The invention provides a mechanism for establishing communication between two parallel programs on a session basis. Once communication is established between the two parallel programs, which can be either two peer programs, or a parallel client and a parallel server, then all tasks of either program are able to freely communicate with each other, by sending messages, or by whatever other means intertask communication is provided. For purposes of describing the invention, we assume that the intertask communication mechanism is some form of message passing, such as the IBM MPL message passing library provided for the IBM SP2 computer. However, the invention applies no matter what the intertask communication mechanism or protocol is. The invention does not describe the intertask communication mechanism itself, which is well known to those skilled in the art, but rather the mechanism for establishing the communication sessions.

A requirement of such message passing systems is that there be a mapping between logical address information, such as task number and identifier, and physical address information, such as a port number, node number or IP (internetwork protocol) address. This mapping is contained in some form of routing table. The routing table is set up when the parallel program is initiated to allow the tasks of the program to communicate among themselves. The present invention describes a method for enabling proper update of the routing tables when the program dynamically requests to communicate with other programs.

By allowing interprogram communication only within the context of an established session, much control is gained over the ability of programs to intercommunicate. In particular, the subsystem through which sessions are established can validate and authorize requests to establish sessions. This can prevent unauthorized communications between tasks of non-connected programs, while avoiding the need to authorize each message sent between the two programs. This can result in a significant performance improvement. Furthermore, the subsystem that establishes sessions can be responsible for updating and appending any routing table information required by the tasks of the two programs when a new session is established.

The advantage of having a session-oriented connection between the two programs is especially apparent when a session is terminated. A session can be terminated by one or the other of the two programs participating in the session. It can also be terminated when either or both of the two programs terminate, either normally or abnormally. Having a separate system for controlling and tracking sessions allows for proper updating of the routing table information kept at each node, and also allows the tasks of each program to be notified in a timely way that a session has ended, so as to allow updating or removal of any local state relevant to the terminated connection.

The invention, therefore, is a family of asymmetrical protocols for establishing sessions between two parallel programs or between a serial program and a parallel program. A protocol that implements the invention will ensure that a communication session between the two programs is correctly initiated.

In the invention, one program is described as the "active" entity, and the other as the "passive" entity, meaning that one program, the active program, initiates the session formation. Protocols that are embodiments of the invention may allow that the passive program can control when programs may connect to it, and which programs may connect to it.

Each program (active and passive) for use with the present invention has associated with it a program manager. The program manager may be a separate process, a separate thread in one of the program tasks, or a handler which runs synchronously within one of the program tasks. The program manager may also be a single entity or process running in the parallel computer and managing all the parallel programs. We describe the invention in terms of the program managers being a separate process for each program, although the invention applies to all program manager configurations. The program manager is able to discover the existence of other program managers, preferably through a central resource manager. One way to do this is to have each program register itself with a central resource manager when it starts up. Another way is for the central manager to keep track of the program managers of each program when it allocates nodes to them and initiates them. In either case, the central manager will respond to queries from program managers, supplying them with the addresses of other program managers. In the case of a single, monolithic program manager, the function of the central manager and the program manager are combined into one entity. This does not change the fundamental steps that are required to implement the invention, but will change the way those steps are implemented.

The family of protocols of the present invention have the following characteristics:

All tasks of the client (active) program request a connection to the server (passive) program. No tasks of the client program will send a message to any server task until all tasks of the client program are informed that all the server tasks have accepted the connection and are ready to receive messages from the client tasks, and that all other client tasks are prepared to receive messages from the server tasks.

All server tasks are passively informed (by the setting of a semaphore in a shared memory space shared with a task manager process, for example) that the client has requested a connection, and act independently of each other to enable communication with the client tasks. No server task will send a message to any client task until it knows that that client task is prepared to receive messages from the server tasks and that all other server tasks are prepared to receive messages from the client tasks.

The server tasks can be free running during the entire duration of the connection establishment. This is important in client-server computing where the server may be servicing requests from other already connected clients, and cannot afford to block while waiting for a new connection to be established.

The client tasks can be free running as long as they obey the prohibition against sending messages to the servers before knowing that all servers are prepared to receive messages from them.

Figure 2:
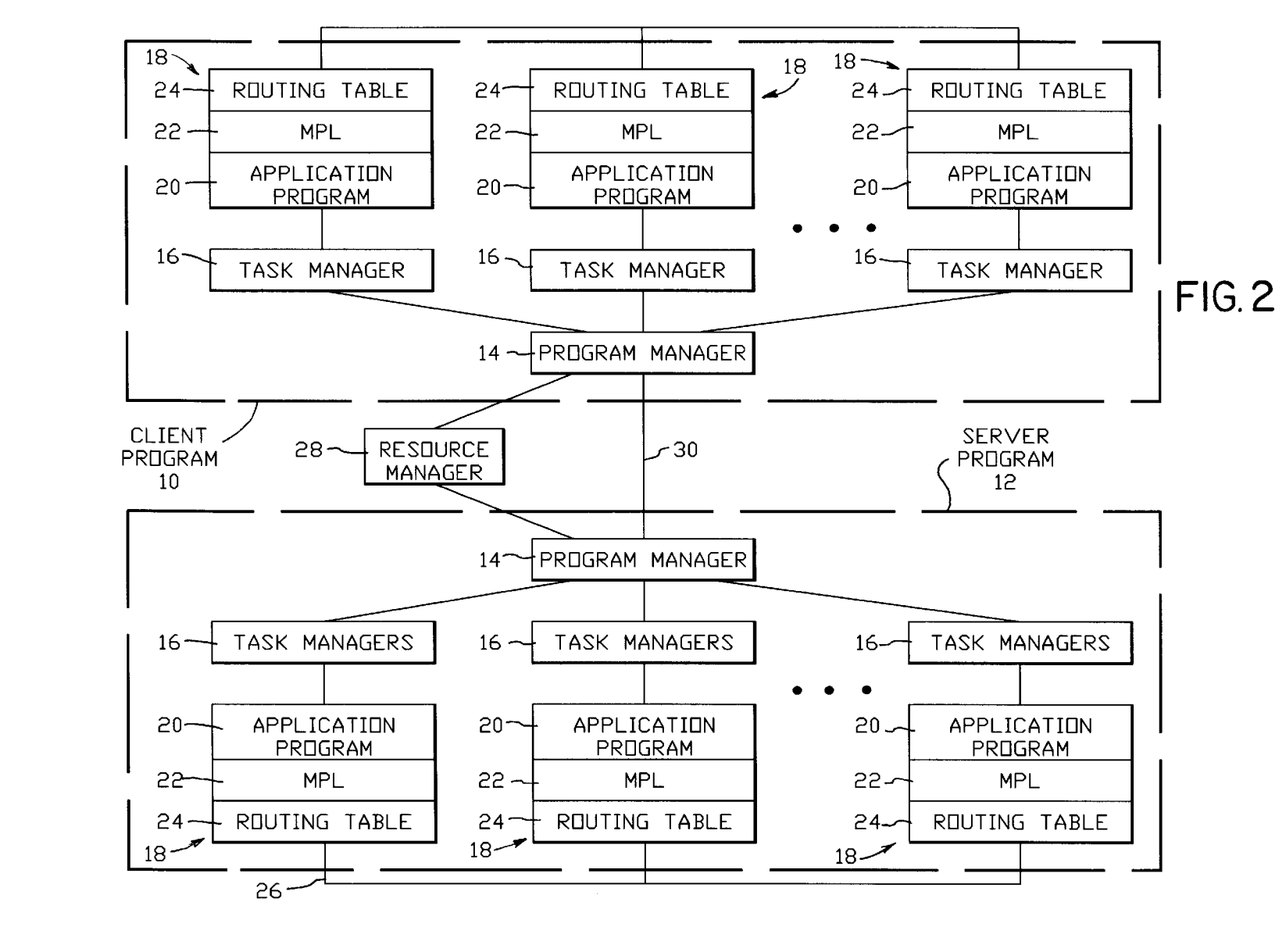
FIG. 2 is a functional block diagram of the system of the present invention.

The functional block diagram of FIG. 2 represents one embodiment of the system of the present invention. For simplicity, FIG. 2 shows only two programs, client program 10 and server program 12, it will be understood that the invention is extendible to the case in which two or more programs are operating, of which two wish to communicate with one another. In a preferred implementation of the invention, the functions represented by the blocks of FIG. 2 will be implemented as software running on one or more general purpose computers.

Each client program 10 and server program 12 has a program manager 14. The function of the program manager is to oversee the tasks that make up that program. In particular, the program manager will run a "run parallel job" program which determines how many nodes are required to be run by the program, and reports the number of nodes needed to a resource manager, to be described later. The program manager also initiates commands to begin tasks on assigned nodes. The program manager will preferably be implemented as software running on the machine to which the parallel program (server or client) is assigned.

Each program will also include one or more task managers 16. The function of the task managers is to manage the semaphores used between it and its associated task. These semaphores indicate a change in the communication status between programs. Each task manager runs on the same machine as its associated task.

Each task manager 16 has associated with it a program or "task" 18 running on a separate node of the machine. Each task includes an application program 20 defining the task, a message passing library 22 (such as the IBM MPL discussed above) and a routing table 24, implemented as part of a MPL 22, that controls which nodes the node with which it is associated can communicate. The characteristics of the routing table depend upon the physical layout of the network that connects the nodes. For instance, if the network is a local area network, or "LAN", the routing table will attach to all messages a destination address. If, on the other hand, the system employs a multistage network, such as in the IBM SP2, the message to be routed will include both destination and routing information.

As shown in FIG. 2, each task is connected by a bus 26. It is to be understood that the depicted bus is a functional representation only, and that the actual configuration will depend upon the type of network selected. As stated above, specific examples of acceptable networks are LAN and multistage network designs.

The system also includes a resource manager 28 that is coupled to each program manager 14 in the system. The resource manager controls the resources of the parallel system. For example, the resource manager assigns nodes to a program in response to a request from a program manager.

The resource manager also can provide, upon request from the program manager of one task, the name and location of the program manager for another program. The resource manager, therefore, facilitates communication between the program managers of different programs. The resource manager runs on a node assigned to it by the configuration of its host machine.

The program managers in the embodiment shown in FIG. 2 are directly coupled by bus 30. This direct connection will allow the program managers to communicate directly in accordance with the protocol to be discussed below. It will be understood, however, that in other embodiments the program managers may communicate via the same communication path used to connect the tasks of the programs. Thus, the protocol is implemented through a secondary virtual communication channel (in FIG. 2, bus 30) which provides a means of indirect communication between clients and servers. This virtual communication channel may be implemented on the same physical communication media as will be used for the eventual message passing between client tasks and server tasks once the connection is made.

A server or client task may be notified of the readiness of other tasks in the other program to receive messages in one of three possible mechanisms. Some protocols in accordance with the invention will notify client or server tasks using only one of the mechanisms. Other protocols may allow multiple different mechanisms to notify the client or server tasks of the readiness of other tasks to receive messages. The client and server tasks may be notified by different mechanisms.

The three mechanisms are as follows. First, a task may be notified that tasks in the other program are ready to receive messages from it by blocking the task at a specific request for a connection, and subsequently allowing the task to resume only when the connection has been established. This can be described as blocking notification, and is used by the active program in the preferred embodiment of this invention.

Second, a task may be notified that tasks in the other program are ready to send messages to it by means of a flag or semaphore (set by the tasks in the other program) that is checked by the task at each message passing call or by an explicit check. This can be described as non-blocking notification, and is used by the passive program when being notified that the active program wishes to establish a communication session in the preferred embodiment of this invention.

Third, a task (of the passive program, e.g.) may be notified that tasks in the other program are ready to receive messages from it when the task receives a message from one of the tasks in the other program. This can be described as implicit notification, and is used in the preferred embodiment of the invention.

Each of these notifications also implies that all other tasks in the program of the notified task are ready to receive messages from tasks in the other program. This is because no task in the notifying program can send messages to the notified program until the notifying program knows that each task of the notified program is ready to receive messages.

We now describe a protocol that is a preferred implementation of the invention. When describing the protocol, we refer to the active program as the client, and to the passive program as the server. In the case of peer-to-peer interprogram communication, one of the two peers must play the role of client and the other of server. In other words, one must actively initiate the connection, while the other passively waits for the connection request.

In any instantiation of the invention, the program manager of the passive program at some point may register that it is willing to accept connections from other programs. This can be actively initiated by the passive program if one of its tasks issues a request to accept connections, or if all tasks issue such a request, and the program manager of the passive program performs a reduction of these requests. In a parallel program, a reduction is the performance of an action if and only if each task of the program has requested to perform the action. At this time, it is also possible for the tasks of the passive program to register a call-back function which will be executed when a new connection is established. Such a function allows the recording of the new connection in data structures that belong to the passive program tasks, and the setting or modification of any internal state relevant to the connection or the connected program in the passive program tasks. The callback function is initiated by the system's communication software, but is part of the application program software. The tasks of the passive program may register a function to be called when a connection is terminated. This function can modify the data structures and internal state in the passive program task associated with the now disconnected program.

This is a preferred protocol that is an instantiation of the invention. First, a task of the client (active) program makes a function call requesting to connect to the server (passive) program. See FIG. 1, block 100. Strictly, it is only necessary for those client tasks that desire to communicate with the server to make the request, although in the preferred embodiment it is required that all client tasks make the request. The passive program can be identified by a well known name, or by a name discovered by querying the central manager. The request call may also require some validation or authorization information to be provided, or this may be provided by the program manager. The program manager of the client makes a reduction of the requests made by each client task. Each client task blocks at the point where it makes its request. Later we will describe an alternative embodiment of the protocol in which this restriction is removed.

Figure 1:
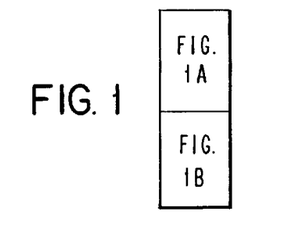
FIG. 1 is a flow diagram illustrating a preferred implementation of the method of the present invention.
Figure 1A:
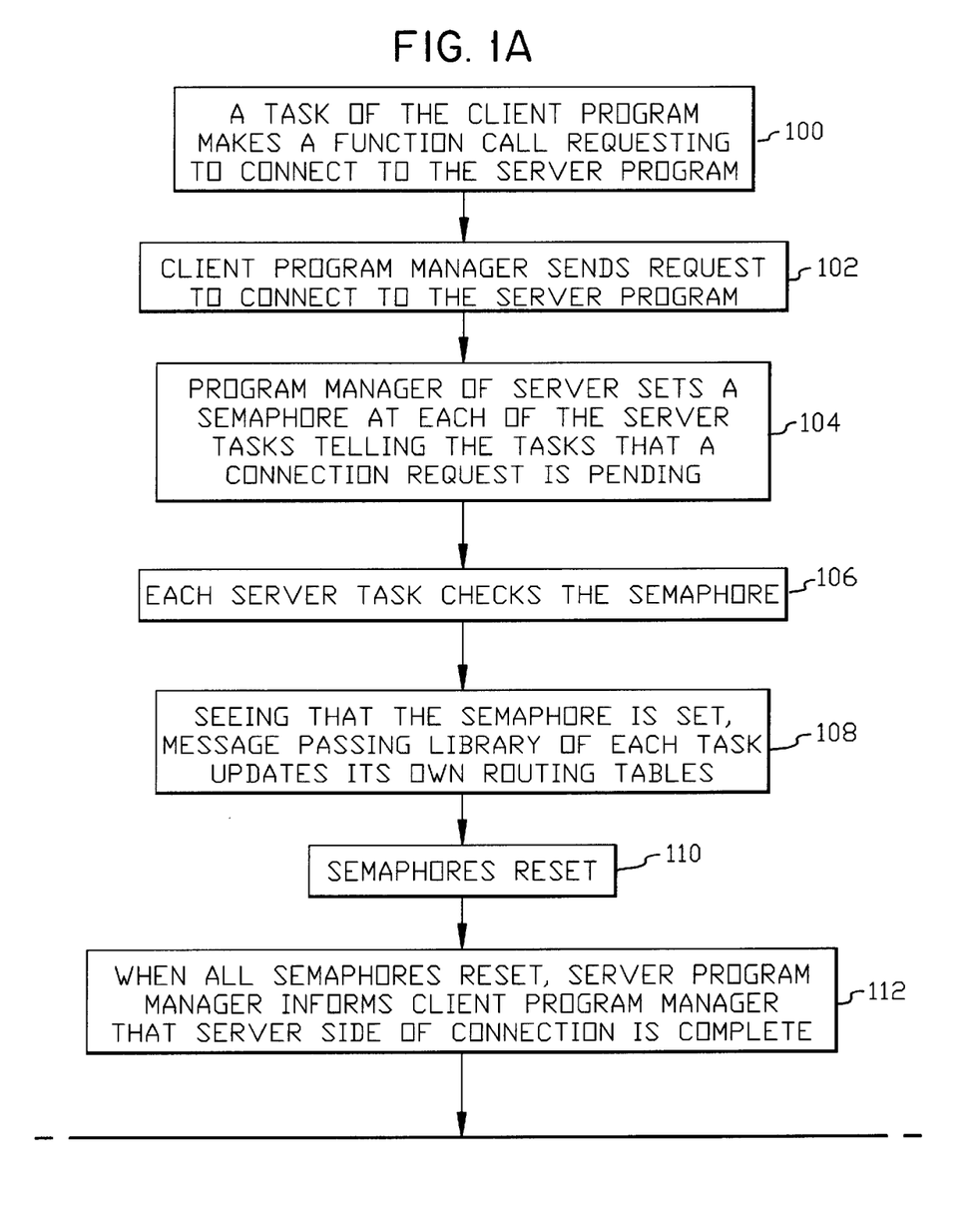
Figure 1B:
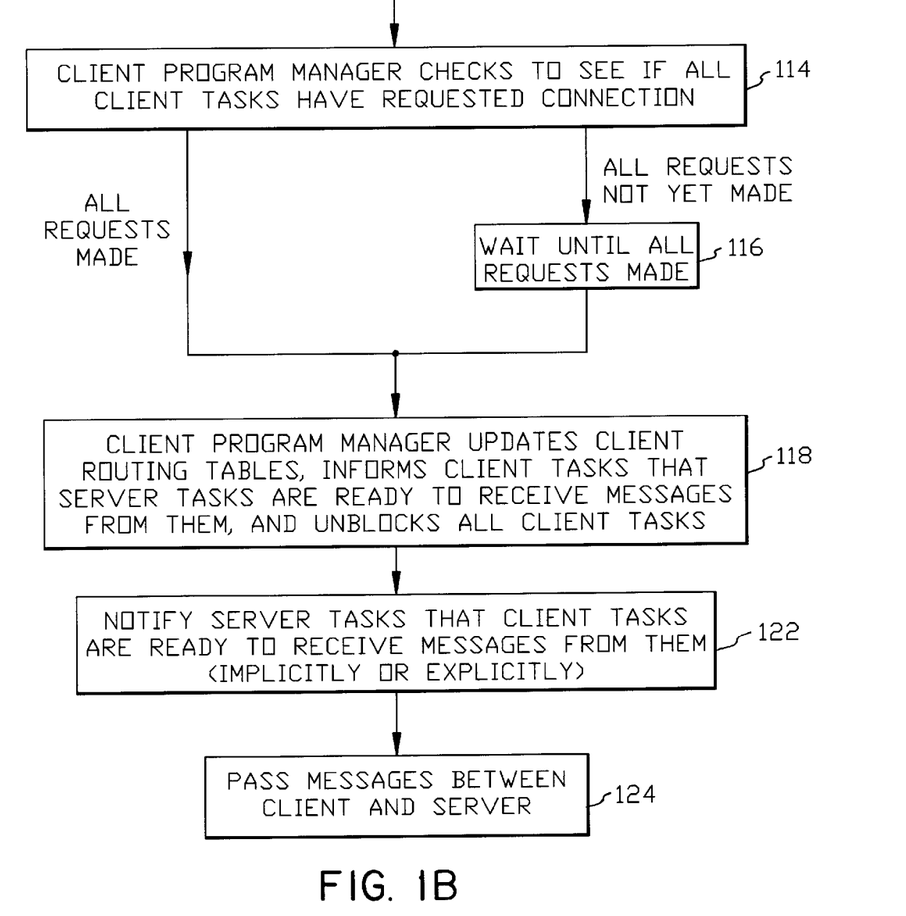

Once it knows that at least one client task has made a request to connect to the server program, the client program manager sends a request to connect to the server (passive) program manager. (Block 102) To locate the server program manager, the client may first have to inquire of the central manager the location of the server program manager. It is also possible that some statically defined servers may have well known program manager addresses. When it receives the connection request, the program manager of the server sets a semaphore at each of the server tasks. This semaphore tells the task that a connection request is pending. (Block 104) The server program manager may use task manager processes running locally with the tasks of the parallel program, or it may do this directly if possible (as in a shared memory parallel computer).

When each server task next makes a message passing call, or otherwise passes control to the library of the message passing system, it checks the semaphore. (Block 106) Code to perform this is preferably implemented as part of the message passing library, although in other implementations the server application might explicitly call for periodic semaphore checks. Seeing that the semaphore is set, and that a new connection is pending, the message passing library updates the routing tables of the server. (Block 108) Note that the routing tables are updated synchronously with a message passing call, and that the thread of execution of the server is in the message passing library when this is done. Therefore, there is no danger of any inconsistency that could arise if the routing tables of the server tasks were asynchronously updated while the server program was running, and possibly issuing message passing calls.

Once the message passing library completes the update of the routing tables, it resets the semaphore, and optionally sends a message to the server program manager indicating that the update has been completed. The system also allows that an attach callback function be called before control is returned to the server program. The attach callback runs in the address space of the server program, and allows the server to update any of its local data structures. For example, a server might keep track explicitly of what client programs are attached to it. The server tasks are restricted from sending any messages to any client task until at least one server task receives a message from any client task. Note that none of the server tasks are blocked at any point in this process.

When the server program manager sees that all server tasks have updated their routing tables, either by polling all the semaphores, or by receiving update messages from all the server tasks, it then informs the client program manager that the server side of the connection is complete. (Block 112)

It is necessary at this point that the client program manager ensure that all client tasks have requested the connection. (Block 114) This will be true if the client program manager waited until all client tasks requested the connection before forwarding the request of Block 100 to the server program manager. The client program manager is not strictly required to wait for all client task requests before initiating contact with the server, however, and if any client tasks have not yet requested the connection by the time the server has responded, the client program manager will now wait for them to make the request. The client program manager then updates client routing tables and releases all the client tasks. (Block 118) This means unblocking them and returning from the connection request call made earlier. This completes a blocking notification of the client tasks that informs them that the server tasks are now ready to receive messages from them. Note that the client tasks are blocked up to this point, and then unblocked. The server tasks are "blocked" in that none of them are allowed to send messages to client tasks until one of them first receives a message from a client task. However, they are otherwise free to run. Receipt of a message from a client task completes an implicit notification of the server tasks that the client tasks are now ready to receive messages from them. (Block 122) This is a reasonable restriction in client-server systems, since servers typically send to clients only in response to request messages received from those clients.

It is possible that not all client tasks wish to communicate with the server, or that not all server tasks are required to communicate with the client. In these cases, the program managers of the client and server must be able to identify the subset of client and server tasks, respectively, that wish to communicate. The protocol for connecting these subsets is identical to the protocol for connecting the full sets of tasks, except that only the subsets of the client and server tasks need to participate. Such subsets of tasks may be identified by a mechanism of the communication system. The "communicators" of the MPI (message passing interface) specification are an example of this.

In a client-server system, a key feature of the invention is that the protocol allows the server tasks to be free running, not requiring them to block at any point in the protocol. In a blocking system, the client must pay the price by blocking until it is sure that the servers are ready to receive messages from it. This wait can be eliminated by allowing the clients to run as long as they do not send to the servers. The restriction that the servers do not send to a client until the server has heard from that client is key to proper operation if the client is unable to receive from any server until after that client is informed that the server is connected to it. This restriction can be lifted if the servers are sure that the clients can receive from them once the server is aware of the clients. However, the restriction is not onerous, as the server typically will send to the client only in response to a message from the client. It is also necessary for a server to be sure that all other server tasks are ready to receive from the client before sending to the client. It is still necessary that the clients not send to the server until the clients are certain that the server is aware of the clients. Such communication can be prevented by not updating the routing tables of the client tasks, or by not allowing the updated portions of the routing tables that contain the server addresses to be used by the client tasks at this time.

It is possible to derive other protocols that meet the characteristics described as important features of the invention, and are thus themselves instances of the invention. For example, a protocol can allow both clients and servers to be free running, and rely on both implicit notification and non-blocking notification to inform the clients that they are free to send to the servers. Such a protocol would allow the servers to send to the clients without first receiving messages from them. However, such a protocol would also have to have the important characteristics described above.

The invention provides a mechanism for a system that can actively mediate and monitor connections. Such a system can also provide the function of informing tasks when a program they are connected to has terminated, either normally or abnormally.

The invention has been implemented by the inventors as part of the MPX (Message Passing, Cross Partition) communication system developed to run on an IBM SP1 computer. The invention was implemented using the preferred embodiment described herein. In the specific implementation of the invention, each node of the client makes a function call MPX_attach, to establish a communication session. Each client task blocks at this call. The function call causes a message to be sent from the client task to the program (partition) manager of the client. The program manager of the client performs a reduction of these requests, and then asks the central (resource) manager for an address of the server program to be attached to. It then sends a message to the program manager of the server program at this address. The program manager of the server program sends a message to the task manager at each of the server program's tasks. The task manager is a separate process at each of the nodes. At each of the server nodes, the local task manager sets a semaphore in a shared memory segment. When the server program task next makes an MPX message passing call, the message passing library checks the shared memory semaphore. If it is set, it examines a message queue for messages from the task manager. Among these messages is a message to update the routing table to add a newly connected client program. Once the routing table is updated, the task informs the task manager of this update by sending a message to it. The task manager in turn sends a message to the program manager of the server. Once the program manager of the server receives response messages from each of its task managers, it sends a message to the client program manager indicating that all server tasks are prepared to receive messages from the client program. When the client program manager gets this message, it sends a message to the task manager at each of its nodes. Those task managers then update the client routing tables, and allow the client tasks to resume. A requirement of the MPX implementation of the invention is that the server tasks not send messages to any client task until one of them has first received a message from that specific client task. In the systems for which MPX is used, this restriction is acceptable. The implementation can be modified as described above to lessen this restriction.

While the invention has been described in particular with respect to various embodiments thereof, it will be understood by those skilled in the art that modifications to the disclosed embodiments can be effected without departing from the spirit and scope of the invention.

What is claimed is:

1. A method for establishing direct communication between a first program having more than one task and a second program having more than one task, the first and second programs running on a plurality of parallel processors and each having a program manager, comprising:

making a program-level request from the program manager for all of the tasks of the first program to connect to the second program;

passing the connect request directly at the program level to the program manager of all tasks of the second program;

when all tasks of the second program have been made aware of the request, providing notification at the program level to all tasks of the first program that a connection between the tasks of the first program and the tasks of the second program is complete, wherein the tasks of the second program are free running while awaiting connection with the first program; and passing at least one communication between the tasks of the first program and the tasks of the second program along the completed connection.

2. The method of claim 1, wherein no task of the first program will attempt to communicate with any task of the second program until after the first program is certain that all the tasks of the second program are prepared to receive messages from the tasks of the first program, and that all tasks of the first program are prepared to receive messages from any task of the second program.

3. The method of claim 1, wherein no task of the second program will attempt to communicate with any task of the first program until the second program is certain that all the tasks of the first program are prepared to communicate with any task of the second program, and that all tasks of the second program are prepared to receive messages from any task of the first program.

4. The method of claim 1, wherein no task of the second program will attempt to communicate with any task of the first program until it is certain that the particular task of the first program it wishes to communicate with is prepared to communicate with any task of the second program.

5. The method of claim 1, wherein the tasks of the second program are free running while awaiting connection with the first program.

6. The method of claim 1, wherein the tasks of the first program are blocked while awaiting connection with the second program.

7. The method of claim 6, wherein the tasks of the first program do not attempt to communicate with the second program until the tasks of the first program have been informed that the connection has been established.

8. The method of claim 1, wherein the tasks of the first program are free running while awaiting connection with the second program, up until the time they attempt to communicate with the second program.

9. The method of claim 1, wherein the connection is mediated through an indirect communication channel between the tasks of the first program and the tasks of the second program.

10. The method of claim 1, wherein the first program is passive and the second program is active, one with respect to the other.

11. A method for establishing direct communication between a first program having more than one task and a second program having one or more tasks, the first and second programs running on a plurality of parallel processors and each having a program manager, comprising the steps of:

making a program-level request by the program manager from all tasks of the first program to connect to a task of the second program;

directly notifying each task of the second program that the request has been made;

when each task of the second program has been made aware of the request, providing notification at the program level by the program manager to all tasks of the first program that a connection between the tasks of the first program and the requested task of the second program is complete, wherein the tasks of the second program are free running while awaiting connection with the first program; and passing at least one communication between all tasks of the first program and one or more tasks of the second program along the completed connection.

12. A parallel computer system comprising:

a first program including more than one task;

a second program including more than one task;

first and second program manager means logically coupled between the first program and the second program for supervising the tasks of the first program and the tasks of the second program and for conveying a communication request from more than one task of the first program to at least one of the more than one tasks of the second program without blocking the tasks of the second program during establishment of a connection for communication; and a task manager means associated with each program;

means responsive to a conveyed communication request for informing the second program that a change in communication status has occurred, said means for informing comprising a semaphore set in the task manager.

13. The system of claim 12, further comprising a resource manager logically coupled between the first program manager and the second program manager, the resource manager comprising means for storing information including the name and location of the first and second programs and for conveying the information to the first and second programs upon request.

14. The system of claim 12, wherein the means for informing the second program that a change in communication status has occurred comprises a task manager means logically coupled between the program manager of the second program and the tasks of the second program.

15. The system of claim 12, wherein the means for informing the second program that a change in communication status has occurred comprises a separate task manager logically coupled between the program manager of the second program and each of the tasks of the second program.

16. A parallel computer system comprising:

a first program including more than one task;

a second program including more than one task;

first and second program manager means logically coupled between the first program and the second program for supervising the tasks of the first program and the tasks of the second program and for conveying a communication request from more than one task of the first program to at least one of the more than one tasks of the second program without blocking the tasks of the second program during establishment of a connection for communication; and means responsive to a conveyed communication request for informing the second program that a change in communication status has occurred, wherein the means for informing the second program that a change in communication status has occurred comprise a semaphore set in each task manager of and readable by the task associated with each task manager.

17. A parallel computer system comprising:

a first program including more than one task;

a second program including more than one task; and first and second program manager means logically coupled between the first program and the second program for supervising the tasks of the first program and the tasks of the second program and for conveying a communication request from more than one task of the first program to at least one of the more than one tasks of the second program without blocking the tasks of the second program during establishment of a connection for communication, wherein both the first program and the second program can register a call back function to be called whenever a connection to that program is made or destroyed.

* * * * *